Aug. 6, 1929.  C. W. HOTTMANN  1,723,620
MIXER
Filed May 5, 1926   3 Sheets-Sheet 1
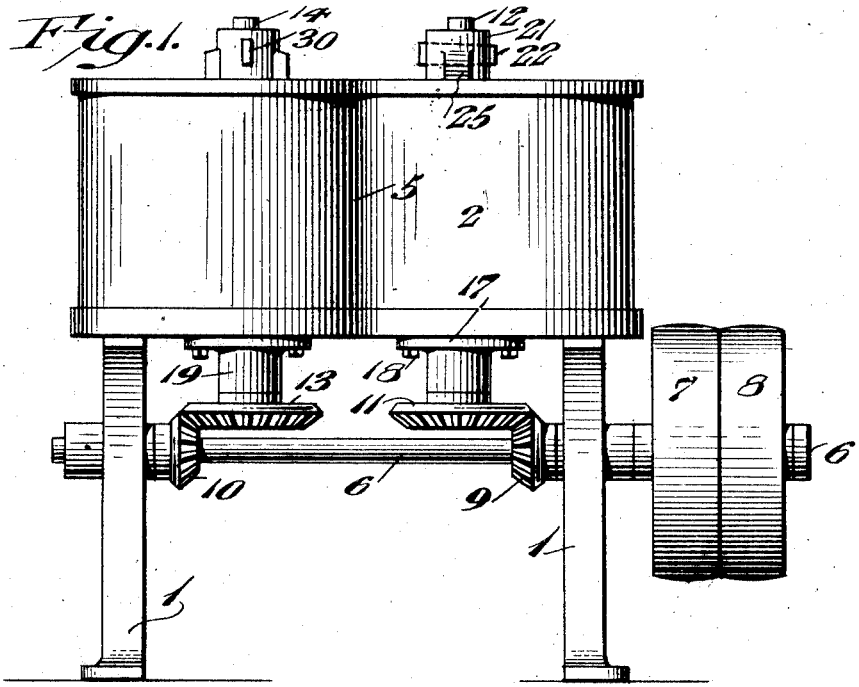
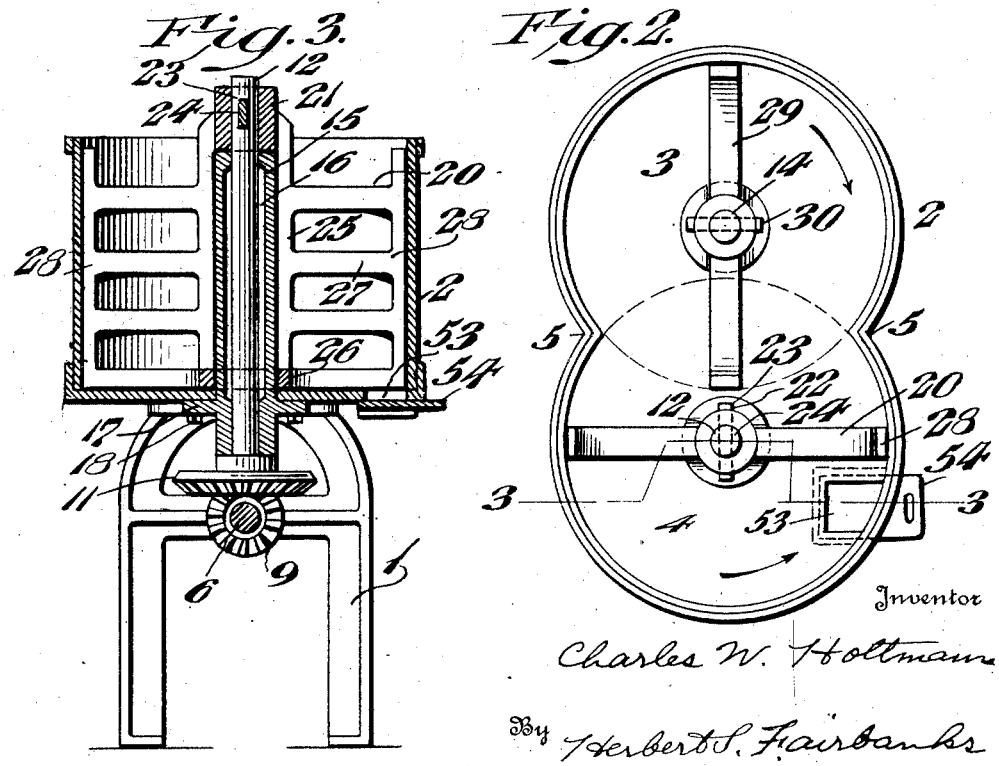
Inventor
Charles W. Hottmann
By Herbert S. Fairbanks
Attorney Aug. 6, 1929. C. W. HOTTMANN 1,723,620
MIXER
Filed May 5, 1926 3 Sheets-Sheet 2

Inventor
Charles W. Hottmann
By Herbert S. Fairbanks
Attorney

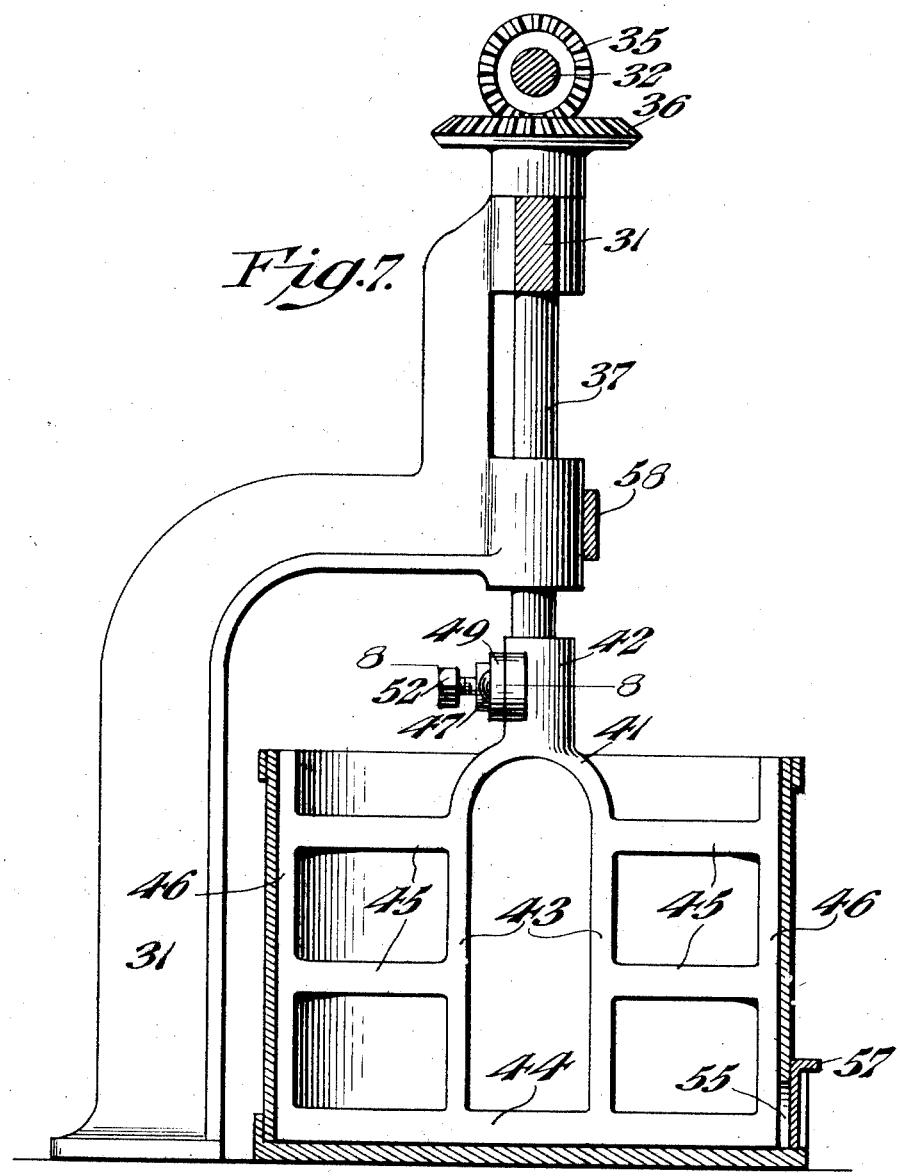
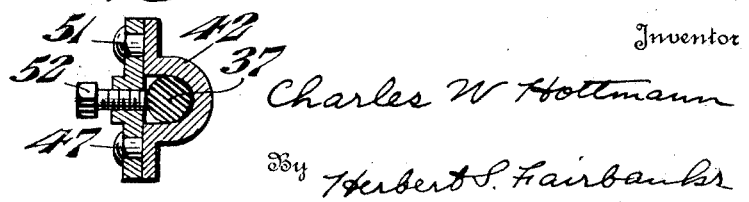

Patented Aug. 6, 1929.

1,723,620

UNITED STATES PATENT OFFICE.

CHARLES W. HOTTMANN, OF PHILADELPHIA, PENNSYLVANIA.

MIXER.

Application filed May 5, 1926. Serial No. 106,798.

In mixing machines of the commercial type as heretofore manufactured, it has taken an abnormal amount of time to effect the mixing of the materials due to the fact that the action of the mixing blades was such that a more or less dead spot or zone was present for a considerable period of time.

Furthermore, in the mixing of numerous kinds of material it is advantageous to have the mixing action completed in as short an interval of time as is possible, not only from a view point of economy in operation, but also because, if the mixing action is prolonged, the material is liable to become heated to too high a degree, with deleterious effect on the material.

The object of my present invention is to devise a mixer in which the material will be thoroughly mixed in a minimum of time, and in which the paths through which the mixing blades travel will intersect in such a manner that the material being mixed is in continuous motion and dead zones or spots in the mixing chambers are eliminated.

With the above and other objects in view as will hereinafter more clearly appear, my invention comprehends a novel construction and arrangement of a mixer.

It further comprehends a novel mixer wherein is provided a novel construction and arrangement of a mixer casing, novel means for causing the mixing members to travel in said casing and have their paths intersect each other, and novel means for actuating the mixing members.

It further comprehends a novel mixing machine of the type herein set forth, wherein the construction is such that the material after being mixed will be automatically discharged, and, in practice, the machine is of such height that a truck can be located beneath the discharge opening to receive the material which has been treated.

It further comprehends novel means for securing the mixing members within the mixing chamber whereby they can be readily removed when desired so that the machine can be maintained at all times in a sanitary condition.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and the invention is not, therefore, limited to the precise arrangement and organization of these instrumentalities.

Figure 1 is a front elevation of a mixing machine embodying my invention.

Figure 2 is a top plan view thereof.

Figure 3 is a section on line 3—3 of Figure 2.

Figure 7 is a section on line 7—7 of Figure 5.

Figure 8 is a section on line 8—8 of Figure 7.

Similar numerals of reference indicate corresponding parts.

Referring to the drawings:—

Figure 5:
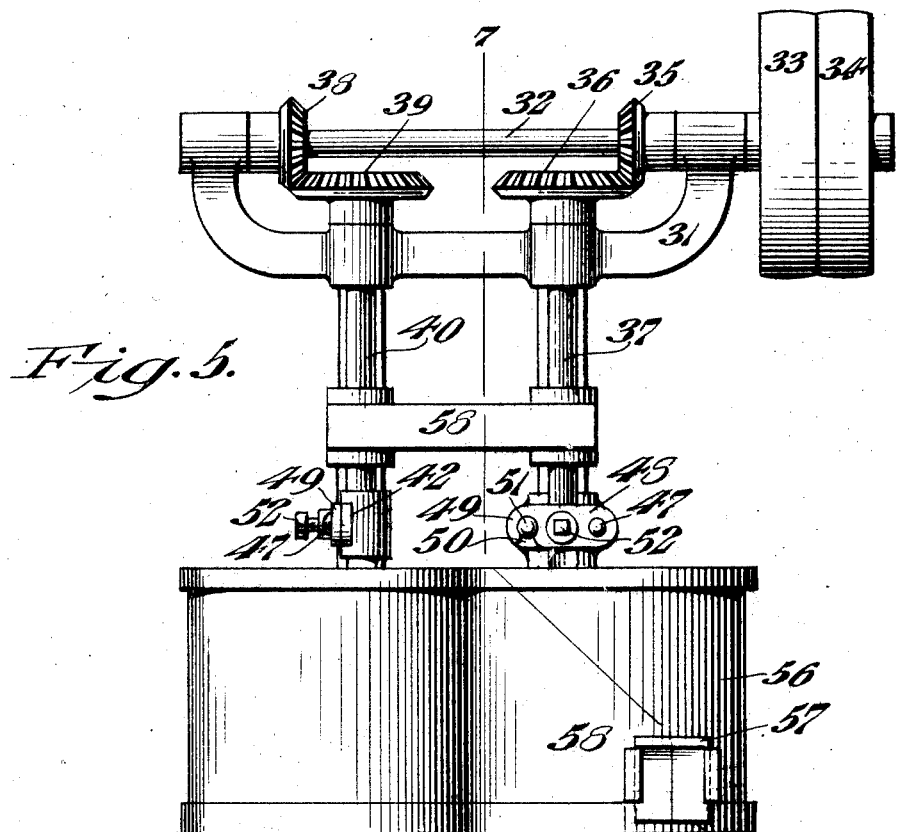
Figure 5 is a front elevation of another embodiment of my invention.
Figure 4:
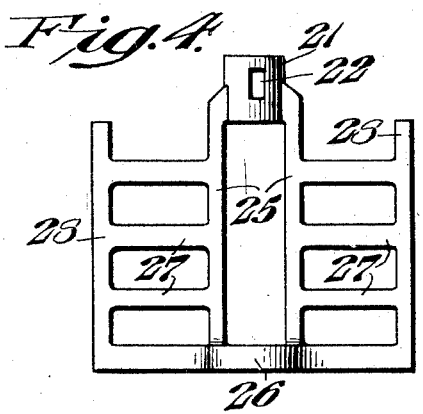
Figure 4 is a front elevation, in detached position, of a mixing blade used in conjunction with the embodiment seen in Figures 1 to 3 inclusive.

Referring first to the embodiment seen in Figures 1 to 4 inclusive, 1 designates the standards or supporting frame work of a mixing machine embodying my invention, it being understood that the construction and arrangement of the supporting frame work may vary widely in accordance with conditions and requirements met with in practice.

2 is a mixer casing which is supported upon and secured to the supporting frame work 1 in any desired or conventional manner. The casing 2 is provided with the mixing chambers 3 and 4, respectively, which intercommunicate and are circular in cross section but so arranged that the converging walls 5 of the two chambers will cause the material in one chamber by its mixing blade to be brought into contact and mixed with the material being circulated by a mixing blade in an adjoining chamber.

The frame work has journalled in it a driving shaft 6, having thereon a tight pulley 7 and a loose pulley 8, thereby adapting it to be driven by any desired source of power.

The driving shaft 6 is provided with the bevelled gears 9 and 10, respectively. The gear 9 meshes with a bevelled gear 11 which is mixed to a shaft 12, and, in a similar manner, the gear 10 meshes with a bevelled gear 13 which is fixed to a shaft 14.

A shaft 12 is journalled in a sleeve bearing 15 which is recessed as at 16 in order to reduce the friction, and the bearing 15 at its lower end carries a flanged collar 17 which is secured to the bottom of the mixer casing 2 by means of fastening devices 18.

In a similar manner, the shaft 14 is journalled in a flanged sleeve 19 similar in construction to that of the sleeve 15 and secured in a similar manner to the bottom of the mixer casing 2, so that a detailed description of such construction is believed to be unnecessary.

The construction of the mixer blade may vary widely in practice, and I have shown, for the purpose of illustration only, a mixer blade which has a collar 21 at its upper end which is apertured at 22 to receive a pin or key 23 which passes through said aperture 22 and through a slot 24 in the shaft 12.

The collar 21 is connected by bars 25 with a lower collar 26 and these bars 25 are connected by means of cross bars 27 with the scraping members 28 which are in close proximity to the inner periphery of the mixing chamber in which they are mounted, so that the material being treated can not accumulate on the walls of a mixing chamber.

The other mixing blade 29 is of a similar construction to that already described with reference to the mixing blade 20, and it is secured to the shaft 14 by means of a pin or key 30 and in a similar manner already described with reference to the mixing blade 20 secured to the shaft 12.

In the embodiment seen in Figures 5 to 8 inclusive, the construction of the casing and the mixing action is the same, the difference in this embdiment being that I have shown the driving mechanism for the mixing blades as located above the casing instead of below the casing, as in Figure 1, and I have shown a different manner of connecting the mixing blades to the shafts which drive them.

In this embodiment, 31 designates a frame work, in which is journalled a driving shaft 32 which carries a tight pulley 33 and a loose pulley 34, thereby adapting the shaft 32 to be driven by any desired source of power.

The shaft 32 has fixed thereto a bevelled gear 35, meshing with a gear 36, on a shaft 37, and it is also provided with a gear 38, which meshes with a gear 39 of the shaft 40.

Figure 6:
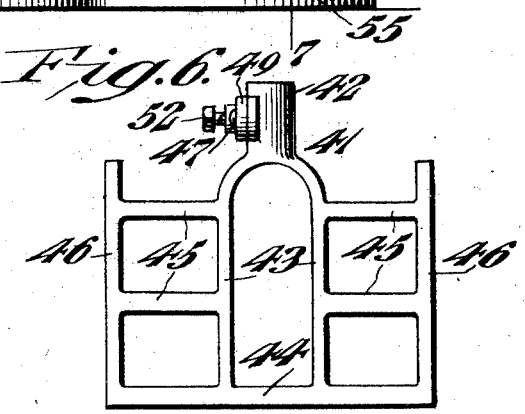
Figure 6 is a front elevation of the mixing blade shown in Figure 5, in detached position, showing more particularly its fastening means.

The shaft 40 is journalled in the frame work 31. The shafts 37 and 40 are connected in the same manner to their respective blades 41, which, as seen in Figure 6 are each provided with a collar 42 from which depend the bars 43, which are connected at their lower ends by the cross bars 44, and the bars 43 are connected by the cross bars 45 and by the cross bars 44 to the end scraping members or bars 46.

Each collar 42 has pivoted to it, at 47, a blade or block, 43, which, at its opposite end, is provided with an aperture 49 and a slot 50 opening into said aperture, so that the block 48 can be fixed in position by means of a fastening device 51.

This block 48 carries a fastening device 52 of any desired character and which, as shown, consists of a set screw 52 adapted to engage the shaft 37 to fix the mixer blade with respect thereto.

It will be understood that the shaft 40 has connected with it a mixing blade similar to the blade 41 already described. Any desired character of a controllable discharge outlet may be provided, and this may have any desired location with respect to the mixing chamber.

For the purpose of illustration, I have shown in Figure 3, a discharge outlet 53 in the bottom of the mixer casing which is controlled by a gate or valve 54.

In the embodiment seen in Figure 5, I have shown a controllable discharge outlet 55 in the side wall of the mixer casing 56 which is controlled by means of a gate or valve 57.

The mixer casing 58, seen in Figure 5, is similar in construction and contour to that seen in Figure 2, and its mixing chambers are of the same construction and arrangement. The frame 31 is reinforced by a cross bar 58.

The operation of my novel mixer will now be apparent to those skilled in the art and is as follows:—

The material to be mixed is placed in either or both of the mixing chambers 3 and 4, and it will be seen that the material can be inserted either from the front or the rear of the mixing chambers or at the ends of the mixing chambers.

Referring first to the embodiment seen in Figures 1 to 4 inclusive, it will be seen that, as the driving shaft 2 is revolved, the mixer shafts 12 and 14 together with their mixing blades will be revolved in the direction of the arrows seen in Figure 2.

The material which is circulated and mixed by the mixing blade 20 is brought into the path of the material being mixed by the mixing blade 29 so that a very thorough mixing action is obtained, and the material can not collect at the central portion of the mixing chamber or at the outer portion, so that no dead spots or zones will be present in which the mixing action is not taking place.

The scraping bars 28 travel in close proximity to the inner periphery of the walls of their respective mixing chambers, so that the material can not collect on such walls and all the material effectively circulated and mixed.

As soon as the mixing action is completed the gate 54 is opened and the material which has been treated will be automatically discharged through the discharge opening 54, which may have any desired location with respect to the mixing chamber.

When it is desired to clean the machine, the keys 23 and 30 are removed, and the mixing blades are then removed, so that the mixing chambers can be cleaned with any desired cleaning liquid, and all parts of the machine can be readily maintained at all times in a sanitary condition.

Referring now to the embodiment seen in Figures 5 to 8 inclusive, the operation is the same as that already described and will be clear to those skilled in the art by reference to the description of the operation of the construction seen in Figures 1 to 4 inclusive.

When it is desired, in this embodiment, to remove the mixing blades the fastening devices 51 are loosened and the blocks 48 are swung out of engagement with them.

The blocks 48 are turned on their pivots 47, and the mixing blades can be disengaged, as will be apparent, by giving them a slight sidewise movement.

As soon as the mixing action is completed, the material is automatically discharged through the discharge opening 55.

My present invention is especially adapted to be employed in mixers of any desired capacity, and is especially advantageous where several hundred pounds of material are to be mixed at the same time.

It will now be apparent that I have devised a new and useful mixer which embodies the features of advantage enumerated as desirable in the statement of the invention and the above description, and that while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a mixer, a casing having intercommunicating mixing chambers, the walls of which converge inwardly at opposite sides and are connected to form intersecting circular mixing chambers one of which has a discharge port in its bottom wall, a valve controlling said port, a sleeve bearing extending upwardly into each chamber and having a flange to engage the bottom wall of its chamber, means to secure each flange to the bottom wall of its chamber in such a manner as to prevent leakage, a shaft journalled in each bearing sleeve, a mixing blade detachably connected at the upper end of each shaft and provided with an upper and a lower collar, said mixing blade having bars which scrape the inner wall of its chamber and having a bar which scrapes the bottom wall of its chamber, said lower collar having a bearing on said sleeve bearing, and means to drive said shaft.

2. In a mixer, a casing having intercommunicating mixing chambers, the walls of which converge inwardly at opposite sides and are connected to form intersecting circular mixing chambers one of which has a discharge port in its bottom wall, a valve controlling said port, a sleeve bearing extending upwardly into each chamber and provided with a flange, a mixing blade for each chamber provided with a flange, a shaft journalled in each sleeve bearing, a mixing blade for each chamber provided with an upper collar fixed to said shaft, said mixing blade having bars which scrape the inner wall of its chamber and having a bar which scrapes the bottom wall of its chamber, means to secure each flange to the bottom wall of its respective chamber in such a manner as to prevent leakage through its chamber, and means to drive said shafts.

CHARLES W. HOTTMANN.